Dec. 26, 1933.  F. H. BRYANT  1,940,742
COMBINATION DRAIN AND PIPE COUPLING
Filed Sept. 20, 1932   2 Sheets-Sheet 1
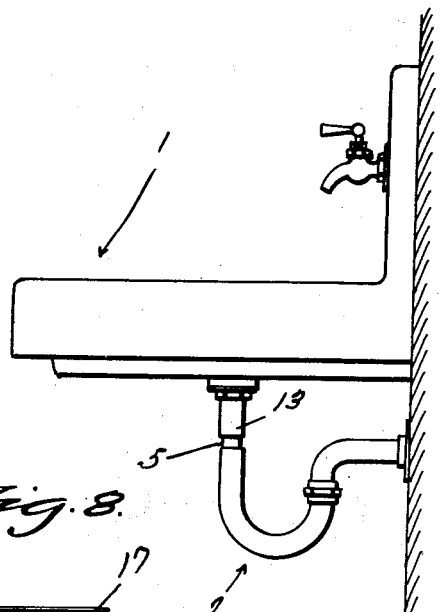
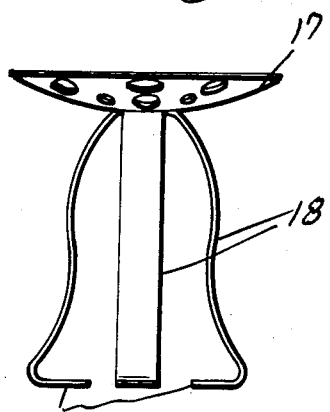
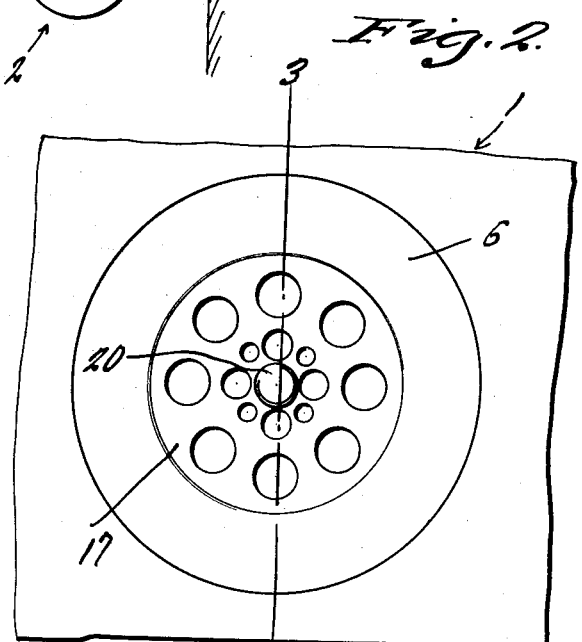
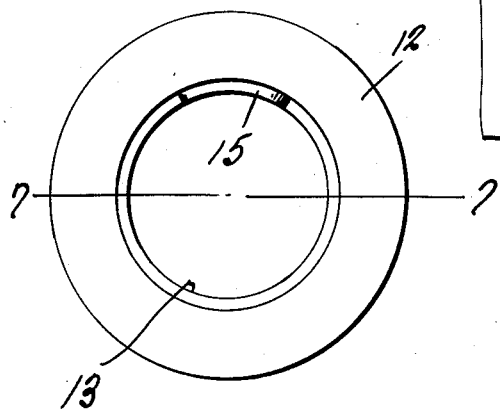
Inventor
Frank H. Bryant
By Clarence A. O'Brien
Attorney

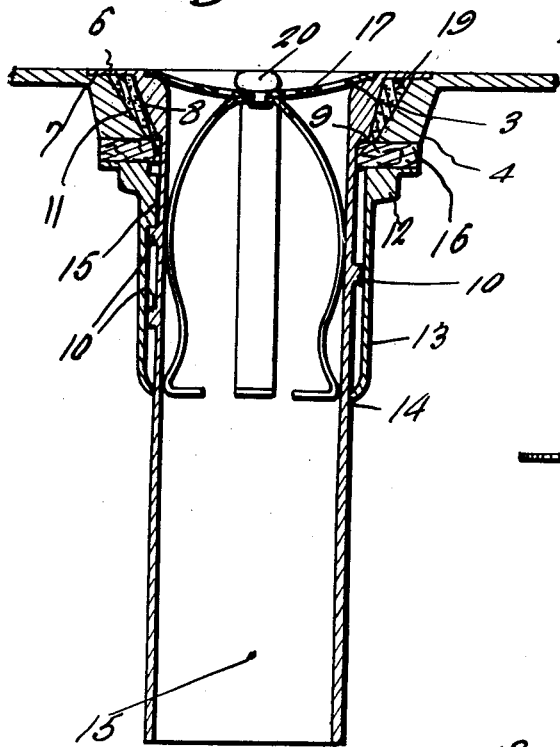
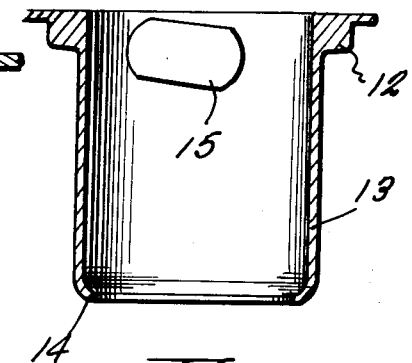
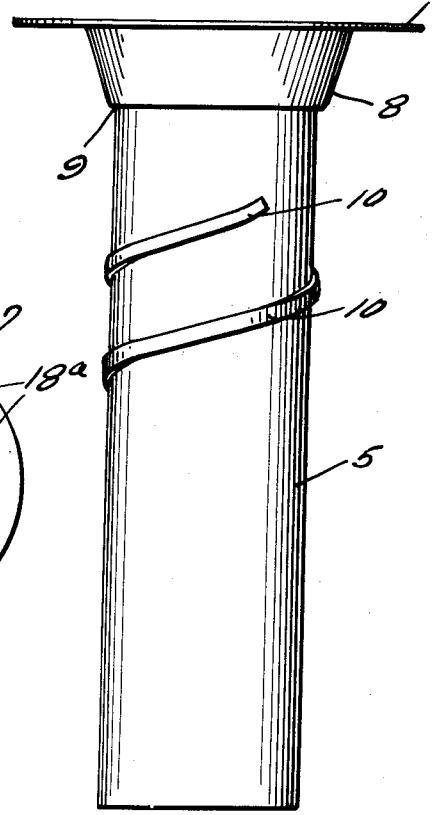
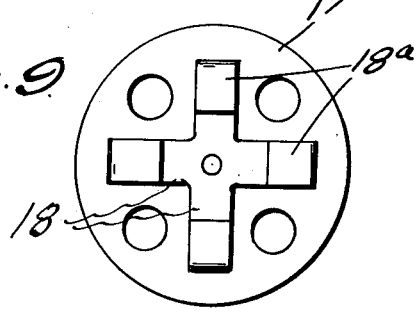
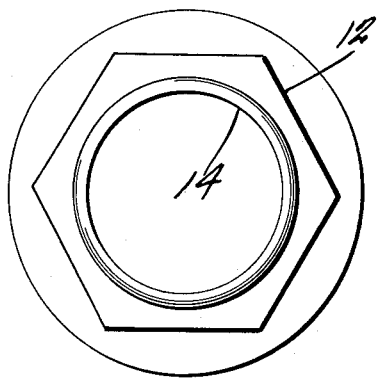

Patented Dec. 26, 1933

1,940,742

UNITED STATES PATENT OFFICE 1,940,742

COMBINATION DRAIN AND PIPE COUPLING

Frank Hensley Bryant, Terre Haute, Ind.

Application September 20, 1932
Serial No. 634,072

2 Claims. (Cl. 285—37)

This invention relates to what may be termed a combination drain and pipe coupling and consists in the provision of a pipe of this character especially but not necessarily limited to use in connection with kitchen sinks.

Briefly, the invention seeks to simplify the construction of combination devices of this character and thereby materially reduce the cost of both initially installing the drain and the subsequent repairing thereof.

Further, my improved construction tends to increase the efficiency of the drain, permits the same to be readily cleaned, and in short, to eliminate the objectionable features of the present day type of combination drain and pipe couplings.

The invention will be best understood from a study of the following description, taken in connection with the accompanying drawings, wherein:

Figure 1 is an elevational view showing the invention applied to a kitchen sink.

Figure 2 is a plan view of the invention.

Figure 3 is a sectional view taken substantially on the line 3—3 of Figure 2.

Figure 4 is an elevational view of a tube or sleeve forming part of the invention.

Figure 5 is an end elevational view of a combined sleeve and nut.

Figure 6 is an elevational view of the opposite end of the combined sleeve and nut.

Figure 7 is a sectional view therethrough taken substantially on the line 7—7 of Figure 6.

Figure 8 is a side elevational view of a strainer disc, and,

Figure 9 is a bottom plan view thereof.

With reference more in detail to the drawings, it will be seen that 1 designates generally a conventional kitchen sink, 2 the drain trap, 3 the drain opening provided in the bottom of the sink, and 4 the depending flange surrounding said opening.

The invention per se, in the preferred embodiment thereof, consists of a tube or sleeve 5 of suitable length provided at its uppermost end with an outstanding annular flange 6 adapted to seat within an annular groove 7 provided in the bottom of the sink 1 about the opening 3. At said upper end the sleeve or tube 5 is thickened and presents a conical bead 8 and a shoulder 9. Below the shoulder 9 the sleeve or tube 5 is provided with a spiral thread 10.

In actual practice, and as shown in Figure 3, with the flange 6 suitably seated within the groove 7, bead 8 is disposed wholly within the confines of the flange 4, and interposed between the bead and the flange is a packing of putty or the like to provide a fluid-tight joint, the packing being designated generally by the reference character 11.

A nut 12 is provided on the upper end of a relatively short sleeve 13 that at its free end has its edge turned inwardly as at 14 to substantially close the space between the peripheral wall of the sleeve 13 and the tube 5 when the nut is threaded thereon. Internally, the sleeve 13 is suitably provided with a lug 15 co-operable with the threads 10 for threading the nut 12 upwardly in a manner to clamp a washer or gasket 16 about the upper portion of the bead 5 between the nut 12 and the corresponding surfaces of shoulder 9 and flange 4.

With the parts applied as described, and shown in Figure 3, it will be seen that the packing 11 of putty will be secured in the space between the bead 8 and flange 4 between the flange 6 of the tube or sleeve 5, and the washer 16, clamped in position as just stated.

As shown in Figure 1, the sleeve 5 will be of such a length as to have its lower end telescope into one end of the trap 2, and caulking or any other method may be resorted to to insure a water-tight joint between the trap end and sleeve 5.

There is also provided a strainer, which as shown in Figure 8 comprises a concave disc-like body 17 of metal or other suitable material and suitably perforated to permit the passage of water therethrough. The body 17 of the strainer is provided on its underside with a resilient anchor consisting of a plurality of angularly related spring arms 18 suitably secured at one end to the convex side of the strainer.

At their free ends the arms 18 are bent inwardly as at 18a to provide fingers so related as to enable them to serve the purpose of the spider now employed in sink drains and usually located in the drain below the strainer.

In use, and as clearly shown in Figure 3, the body 17 of the strainer is arranged within the upper end of the tube or sleeve 5, an annular seat 19 being provided for the strainer at said upper end of the tube or sleeve 5. The strainer 17 is disposed with its concave side upward, and with the spring arms 18 extending downwardly and frictionally engaging the interior of the tube or sleeve 5, it being noted that the arms 18 are bowed outwardly to insure yieldable frictional contact with the body of the sleeve 5.

To facilitate both the positioning of, and the removal of the strainer 17, there is provided a suitable knob 20 which lies wholly within the cavity of the strainer.

From the above it will be apparent that I have provided a combination strainer and pipe coupling which consists of comparatively few parts, can be readily and easily installed, and which can be repaired and cleaned with facility, and without requiring the services of an experienced plumber.

Even though I have herein shown and described the preferred embodiment of the invention, it is to be understood that the same is susceptible of further changes, modifications and improvements coming within the scope of the appended claims.

I claim:

1. A drain for sinks and the like comprising an elongated tubular member having an upper end portion adapted to be positioned within a drain opening formed in the bottom of the sink, and provided at said upper end with a flange to engage the sink bottom, and an external conical bead fitting within the depending flange usually surrounding the drain opening; said tubular member below said bead being also provided with a spiral thread, a nut member on the tubular member coacting with said flange to secure the tubular member in place, and having a skirt portion to conceal the spiral thread when the nut member is in clamping position relative to the flange, a lug on the inside of the skirt coacting with the thread to screw the nut home; said skirt portion having its free end contracted to snugly fit about the tubular member below said thread.

2. A drain and pipe coupling assembly for a sink having a drain opening in the bottom thereof together with a depending flange surrounding the opening; said assembly including a tubular member having an upper end adapted to be positioned in the drain opening and the lower end adapted to be connected with a waste pipe, a bead on the upper end of said tubular member adapted to be positioned within and spaced relative to said flange to provide a space for a sealing agent, a flange on the upper end of the tubular member and resting on the sink bottom for closing the upper end of said space, a gasket disposed about the tubular member to engage the lower ends of the bead and flange and close said space at the lower end of the latter, and a nut member threaded on the tubular member for clamping the latter and the gasket in place.

FRANK HENSLEY BRYANT.